Patented Dec. 12, 1933

1,939,305

UNITED STATES PATENT OFFICE 1,939,305

ELIMINATION OF MANGANATES IN THE PRODUCTION OF TRI - ALKALI PHOSPHATES FROM FERROPHOSPHORUS

George Klein, Chicago, Ill., assignor to Victor Chemical Works, a corporation of Illinois No Drawing. Application January 11, 1932
Serial No. 586,078

3 Claims. (Cl. 23—106)

This invention relates to improvements in the preparation of tri-alkali phosphate from ferro-phosphorus, and more particularly to the preparation of tri-sodium phosphate.

In carrying out the preparation of tri-alkali phosphate from ferro-phosphorus and an alkali phosphate or an alkali carbonate, there is frequently present in the ferro-phosphorus a minor proportion of manganese which, under certain conditions, may cause considerable difficulty. Manganese has a tendency to form an alkali manganate, such as sodium manganate, where a sodium alkali is used, which, being soluble, goes through the leaching process into the crystallizers where it is converted into manganese dioxide and causes a discoloration of the crystallized tri-sodium phosphate.

In accordance with this invention, the formation of sodium manganate may be prevented by control of the proportions of ferro-phosphorus and caustic soda or sodium carbonate. I have discovered that by the use of a slight excess of ferro-phosphorus in the original mixture, the formation of sodium manganate is, in a large measure, prevented, the manganese present taking unobjectionable form.

The ferro-phosphorus may vary in phosphorus content from, say 10 to 30% and in general is preferably from 22 to 26% phosphorus. Ferro-phosphorus is ground very finely, say, to about 200 mesh and is then mixed with an alkali or alkali metal carbonate such as sodium or potassium carbonate, or the like, and preferably the former. The reacting proportions are, for example, 43.8% of ferro-phosphorus containing 25% phosphorus with 56.2% soda ash. In accordance with this invention, instead of using 43.8% of ferro-phosphorus, an excess, say, from ½ to 5% additional, preferably about 1% is added. That is, say, 44.2 to 45% of ferro-phosphorus or correspondingly less of the carbonate may be used. Corresponding amounts may be used in connection with ferro-phosphorus having other phosphorus contents.

The mixture is then heated in an oxidizing atmosphere at a reacting temperature, preferably below fusion, and the tri-sodium phosphate thereafter leached out as by an alkaline leaching liquor and the tri-sodium phosphate crystallized therefrom, for example as set forth in the co-pending application of Howard Adler, Serial No. 566,182, filed September 30, 1931.

The use of the excess of ferro-phosphorus does not interfere with the efficiency of the operation since it is oxidized to ferric phosphate during the process and when acted upon by alkali in the leaching process, it is converted to tri-sodium phosphate.

The foregoing detailed description has been given for clearness of understanding only, and no unnecessary limitations should be understood therefrom, but the appended claims should be contrued as broadly as permissible, in view of the prior art.

What I regard as new, and desire to secure by Letters Patent is:

1. The process of producing tri-alkali phosphates by heat treatment of admixed ferro-phosphorus containing manganese and an alkaline substance of the group consisting of alkali hydrates and alkali carbonates, characterized by preventing the formation of alkali manganate by incorporating an excess of the order of ½ to 5% over the chemically equivalent amount of ferro-phosphorus with said alkaline substance.

2. The process as set forth in claim 1, characterized by incorporating an excess of from ½–5% of ferro-phosphorus above the chemically equivalent amount.

3. The method as set forth in claim 1, characterized by incorporating an excess of 1% of ferro-phosphorus above the chemically equivalent amount.

GEORGE KLEIN.